United States Patent [19]

Matsumura et al.

[11] Patent Number: 4,794,055
[45] Date of Patent: Dec. 27, 1988

[54] GAS MANIFOLD FOR A FUEL CELL

[75] Inventors: Mitsuie Matsumura; Hiroaki Urushibata, both of Amagasaki, Japan

[73] Assignee: Mitsubishi Denki Kabushiki Kaisha, Japan

[21] Appl. No.: 32,540

[22] Filed: Apr. 1, 1987

[30] Foreign Application Priority Data

Apr. 2, 1986 [JP] Japan .................................. 61-78853

[51] Int. Cl.⁴ ............................................. H01M 2/08
[52] U.S. Cl. ...................................... 429/35; 429/34; 429/18; 429/185
[58] Field of Search ...................... 429/34, 35, 185, 18

[56] References Cited

U.S. PATENT DOCUMENTS

| 4,467,018 | 8/1984 | Schroll | 429/18 |
| 4,548,874 | 10/1985 | Katz et al. | 429/18 |
| 4,623,596 | 11/1986 | Kamoshita | 429/26 |

OTHER PUBLICATIONS

DOE Report SAN/11304-15, pp. 144-145, Energy Research Commission, 1980.
DOE Report DOE/ET/15440-5, pp. 2-25, United Technologies Corporation, 1980.

Primary Examiner—Aaron Weisstuch
Attorney, Agent, or Firm—Leydig, Voit & Mayer

[57] ABSTRACT

A gas manifold for a fuel cell provided on the side of a fuel cell stack comprises a casing, a corrosion protection layer provided on contact areas between the casing and side of the fuel cell stack and portions adjacent thereto for protecting the casing from corrosion, an insulating layer provided on the outer surface of the corrosion protection layer for protecting the electrical insulation, and a thermal stress relief layer provided between the insulating layer and the corrosion protection layer for relieving the thermal stress therebetween. By the use of the gas manifold, electrical insulation between single fuel cells through the gas manifold and between the fuel cell stack and the gas manifold can be maintained for long periods of time, thus enabling the stable operation of the fuel cell for long periods of time.

17 Claims, 2 Drawing Sheets

GAS MANIFOLD FOR A FUEL CELL

BACKGROUND OF THE INVENTION

This invention relates to a gas manifold for a fuel cell such as a molten carbonate fuel cell in which the gas manifold supplies reactive gas to fuel cell stacks of the fuel cell and exhasuts reacted gas therefrom, and more particularly to an improvement of insulating properties of a connecting portion of the gas manifold which is installed on the side of the fuel cell stack.

FIG. 1 is a partially cutaway perspective view showing a prior art structure of a molten carbonate fuel cell stack which is disclosed, for example, in a DOE Report, SAN/11304-15, pp. 144–145. In FIG. 1, a fuel cell stack 1 is assembled in a box-like shape by a plurality of laminated single fuel cells 2, a pair of end plates 31 and 32 as auxiliary members, and a plurality of separators 4.

The single fuel cell 2 is composed of a fuel gas side electrode 5, an oxidant gas side electrode 6, and an electrolyte layer 7 which is sandwiched therebetween. Gas channels 51 and 61 are formed in the electrodes 5 and 6 for supplying a reactive gas to the electrodes 5 and 6, respectively. The gas channels 51 and 61 communicate to the inside of a gas manifold 8 described below.

A plurality of, for example four, gas manifolds 8 are connected on the side of the fuel cell stack 1 as shown in FIG. 1. Some of these gas manifolds 8 distribute fuel gas and oxidant gas to the electrodes 5 and 6 through the gas channels 51 and 61, respectively. At the electrodes 5 and 6 electrochemical reactions occur with the distributed fuel gas and oxidant gas. The reacted fuel gas and oxidant gas are exhausted from the electrodes 5 and 6 through the gas channels 51 and 61, and then gathered in the other manifolds 8, respectively. The gathered gases are then exhausted to the exterior of the fuel cell stack 1. In FIG. 1, arrow A shows the direction of the fuel gas flow, and arrow B the direction of the oxidant gas flow.

A gasket 9 is provided on a connecting portion of the gas manifold 8 for preventing a short-circuit between the single fuel cells 2 through the gas manifold 8. The gas manifold 8 is attached to the side of the fuel cell stacks 1 through the gasket 9. Each of the gas manifolds 8 has a flat-shaped casing 10 composed of metal which is open at one side and closed at the opposite side. A port 10a is provided near the center of the closed side of the casing 10 for supplying or exhausting gases.

The gas manifold 8 is assembled to the airtight against the fuel cell stack 1 through the open side of the casing 10 as shown in FIG. 2. In FIG. 2, the edges of the rectangular open end of the casing 10 are covered with an electric insulating layer 11. The casing 10 is then assembled to the side of the fuel cell stack 1, sandwiching the insulating layer 11 between the casing 10 and the gasket 9.

A molten carbonate type fuel cell, for example, is a type of fuel cell which operates at temperatures around 650° C. This type of fuel cell converts the chemical energy of the fuel gas to electrical energy and by-productive heat energy. This conversion of energy is achieved by electrochemical reactions at the electrodes 5 and 6 with the fuel gas and oxidant gas, respectively. Therefore, in order to operate the fuel cell steadily and to produce electrical output from the fuel cell, it is necessary to continuously supply the reactive gases to the electrodes 5 and 6, and also to continuously exhaust the reacted gases from the electrodes 5 and 6.

In FIG. 1, to achieve the above supply and exhaust of gases, the reactive gases are supplied, using the gas manifold 8, to the electrodes 5 and 6 through the gas channels 51 and 61, respectively. Then, the reacted gases at the electrodes 5 and 6 are gathered and exhausted through the other gas manifolds (not shown), respectively.

In supplying the reactive gas and exhausting the reacted gas of a fuel cell having the structure as shown in FIG. 1, one of the most difficult technical points is the selection of the material and structure of the gasket 9 itself and the portions adjacent to the gasket 9. Firstly, the gasket 9 itself must have sufficient insulating properties to prevent short-circuits between the laminated upper and lower sides of the single fuel cells 2 through the gasket 9, and between the single fuel cells 2 through the gasket 9 and the casing 10. Secondly, during operation of the fuel cell sufficient corrosion resistance is required of the gasket 9 itself, the portions of the casing 10 adjacent to the gasket 9, and portions of the fuel cell stack 1 adjacent to the gasket 9. If the gasket 9 and the other components adjacent thereto do not have sufficient corrosion resistance, products of corrosion may be deposited in voids of the gasket 9 for long periods of operational time of the fuel cell. As a result of such corrosion products, short-circuits could be caused on the single fuel cells 2 themselves or between the single fuel cell 2 and the casing 10 of the gas manifold 8, making it impossible to operate the fuel cell.

For the purposes of preventing short-circuits, an insulating layer 11 composed of an electric insulating material is coated directly on to the end fringe portion of the opening of the casing 10. This layer 11 is for insulating the fuel cell stack 1 from the casing 10 and for preventing the single fuel cells 2 from short-circuiting through the gasket 9 and the casing 10.

The gasket 9 is fabricated from a porous material composed of an inorganic insulating material which has a slight ionic conductivity for the purpose of holding the electrolyte, which has oozed from the electrolyte layer 7, into the voids of the gasket 9. However, short-circuits between the single fuel cells 2 through the gasket 9 are substantially prevented by increasing the electric resistance of the gasket 9. The increase of the electric resistance is achieved by decreasing the void volume of the gasket 9 or changing the shape of the voids of the gasket 9.

The conventional fuel cell having the gasket 9 described above operates favorably for short periods of time. However, since the insulating layer 11 is coated directly on the end portion of the casing 10, for long periods of operation time there arises the following problems, which are mentioned in the DOE Report SAN/11304-15.

The voids in the insulating layer are initially formed from defects that occur during the formation of the insulating layer 11. The electrolyte then permeates into such voids, thus hastening corrosion of the casing 10. Moreover, metal oxides are formed by the corrosion, and accumulate in the voids of the gasket 9, resulting in short-circuits between the single fuel cells 2 or between the single fuel cells 2 and the casing 10.

Secondly, since the fuel cell is operated at temperatures around 650° C., cracking occurs at the insulating layer 11 as a result of thermal stress arising from the differences of thermal expansion coefficients between the insulating layer 11 and the casing 10 of the gas manifold 8. Such cracks can deteriorate the insulating properties of the insulating layer 11 itself, and the corrosion of the casing 10 of the gas manifold 8 would be accelerated by any electrolyte which permeates into the cracks. As the cracks progress, metal oxides are produced as above, resulting in short-circuits between the single fuel cells 2 or between the single fuel cells 2 and the gas manifold 8.

In the conventional gas manifold 8 as shown in FIG. 2, short-circuits due to the above-mentioned reasons occur within several hundred to several thousand hours of fuel cell operation. In addition, electrolyte penetrating the cracks through the insulating layer corrodes the casing surface beneath the insulating layer. As a consequence, the insulating layer peels away from the corroded casing surface. Therefore, one of the important areas for developing fuel cell stacks relates to solving the above problems.

In the conventional gas manifold constructed as above, it is difficult to maintain the insulation between the single fuel cells 2 and between the single fuel cells 2 and the gas manifold 8 for long periods of time, because of the corrosion at the casing 10 of the gas manifold 8 and the cracks arising in the insulating layer 11 from thermal stress. For the same reasons, the fuel cell cannot be stably operated for long periods of time.

SUMMARY OF THE INVENTION

Accordingly, an object of the present invention is to provide a gas manifold for a fuel cell in which the gas manifold can maintain the insulation properties between the single fuel cells and between a single fuel cell of the fuel cell stack and the gas manifold, and which enables stable fuel cell operation for long periods of time.

In order to achieve the above object, according to one aspect of the present invention, there is provided a gas manifold for a fuel cell provided on the side of a fuel cell stack wherein the fuel cell stack is constructed by laminating a plurality of single fuel cells, in which each of the single fuel cells is composed of a fuel gas side electrode, an oxidant gas side electrode, and an electrolyte layer sandwiched therebetween, the gas manifold comprising: a casing; a corrosion protection layer provided on contact areas between the casing and the side of the fuel cell stack and portions adjacent thereto for protecting the casing from corrosion; an insulating layer composed of an insulating material provided over the outer surface of the corrosion protection layer; and a thermal stress relief layer provided between the insulating layer and the corrosion protection layer for relieving thermal stress which arises between the casing and the insulating layer under high temperature conditions.

According to another aspect of the present invention, there is provided a gas manifold for a fuel cell provided on the side of a fuel cell stack wherein the fuel stack is constructed by laminating a plurality of single fuel cells in which each of the single fuel cells is composed of a fuel gas side electrode, an oxidant gas side electrode, and an electrolyte layer sandwiched therebetween, the gas manifold comprising: a casing; a corrosion protection layer provided on contact areas between the casing and the side of the fuel cell stack and portions adjacent thereto for protecting the casing from corrosion; and an insulating layer composed of insulating material provided on the outer surface of the corrosion protecting layer.

According to a further aspect of the present invention, there is provided a gas manifold for a fuel cell provided on the side of a fuel cell stack wherein the fuel cell stack is constructed by laminating a plurality of single fuel cells, in which each of the single fuel cells is composed of a fuel gas side electrode, an oxidant gas side electrode, and an electrolyte layer sandwiched therebetween, the gas manifold comprising: a casing; an insulating layer composed of insulating material provided on contact areas between the casing and the side of the fuel cell stack and portions adjacent thereto; and a thermal stress relief layer provided between the casing and the insulating layer for relieving the thermal stress which arises therebetween under high temperature conditions.

BRIEF DESCRIPTION OF THE DRAWINGS

The present invention will become more readily apparent from the following description of a few preferred embodiments of the invention when taken in conjunction with the accompanying drawings, in which.

DESCRIPTION OF THE PREFERRED EMBODIMENTS

Figure 1:
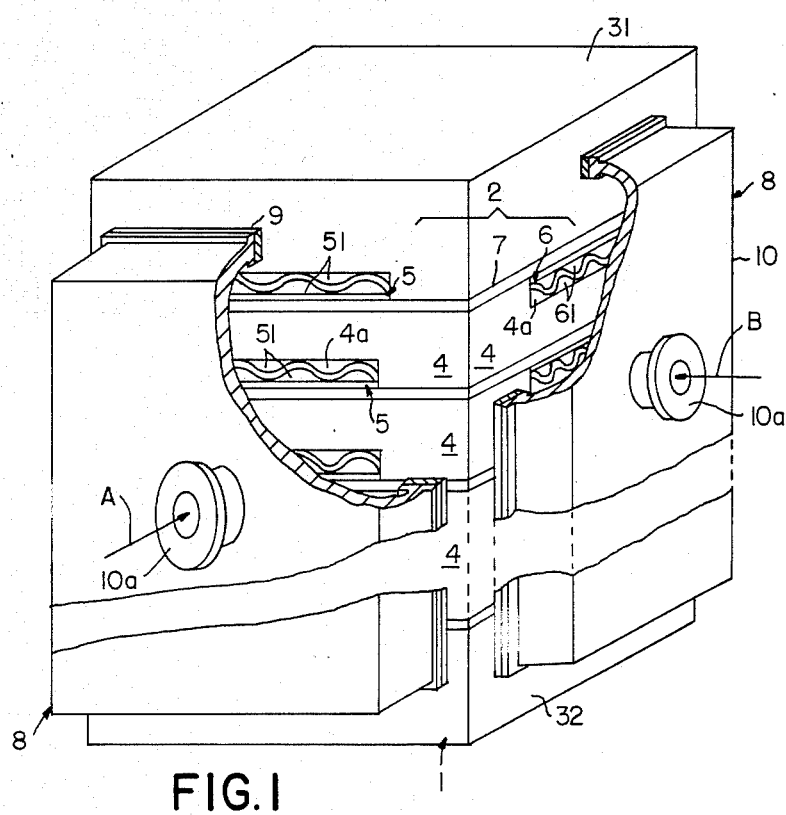
FIG. 1 is a partially cutaway perspective view showing a conventional structure of a molten carbonate fuel cell stack.
Figure 2:
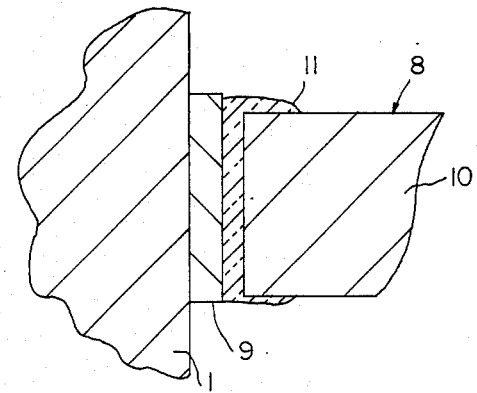
FIG. 2 is an enlarged sectional view showing a conventional connecting portion between the fuel cell stack and a casing.
Figure 3:
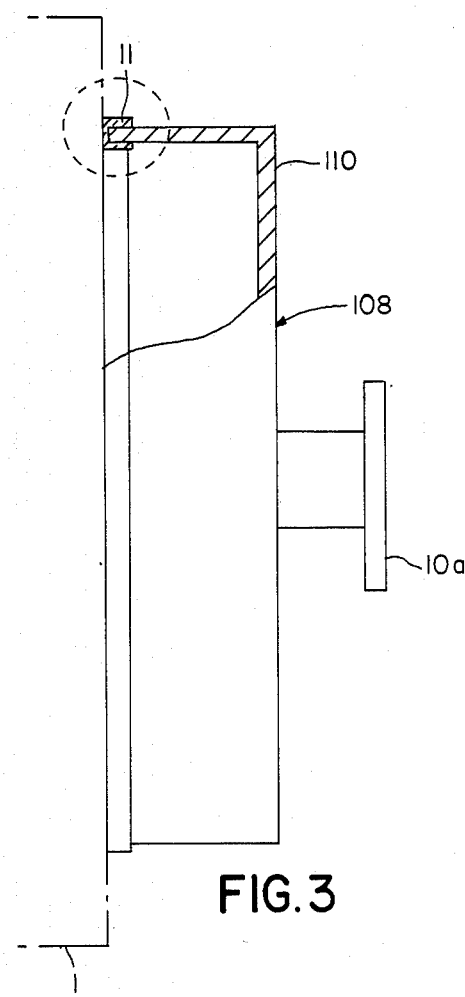
FIG. 3 is a partially cutaway side view showing a gas manifold in accordance with one embodiment of the present invention.
Figure 4:
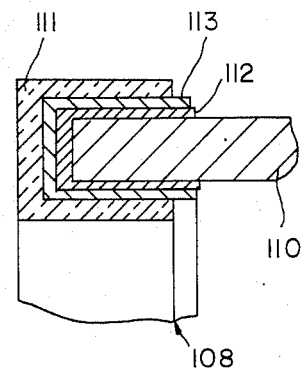
FIG. 4 is an enlarged sectional view showing a connecting portion between a fuel cell stack and the gas manifold in accordance with the present invention.

As shown in FIG. 4, a corrosion protection layer 112 is provided on the connecting end portion of a casing 110 of a gas manifold 108, that is, at areas of contact and portions adjacent thereto of a fuel cell stack 1. A thermal stress relief layer 113 is provided on the outer surface of the corrosion protection layer 112, and an electrical insulating layer 111 is provided on the outer surface of the thermal stress relief layer 113. The gas manifold 108 is assembled on the side of the fuel cell stack 1 using a gasket (not shown) therebetween. For materials of the casing 110 of the gas manifold 108, stainless steels such as SUS 316L, SUS 310S, and SUS 321 are widely utilized for their superior resistance properties against oxidation or corrosion.

The corrosion protection layer 112 protects the casing 110 against corrosion at high temperatures and in electrolytic atmospheres. Therefore, even if pinholes are formed in the electrical insulating layer 111 during the formation thereof, and the electrolyte intrudes into the pinholes, the corrosion protection layer 112 protects the casing 110 from corrosion. As a consequence, the electrical insulating layer does not peel off the surface of the casing 110 as would be the case if the casing 110 were corroded. The corrosion protection layer 112 can be formed by coating, for example, by a spray-coating method, aluminum to a thickness of from several tens of microns to about 200 microns, and then subjecting the coating to a diffusion treatment under a reducing atmosphere at temperatures of 800° C. to 1200° C.

The thermal stress relief layer 113 relieves thermal stress resulting from differences of thermal expansion coefficients between the insulating layer 111 and the casing 110. Therefore, the thermal stress relief layer 113 is preferably composed of materials having thermal expansion of coefficients intermediate between those of the insulating layer 111 and the casing 110. Such materials are required to have a sufficient resistance to corrosion from electrolytes under operating conditions of the fuel cell. Examples of such materials are alloys which are selected from the group consisting of Ni/Cr, Ni/Al, Ni/Cr/Al, and Ni/Cr/Al/Fe, or alloys in which the principal ingredient thereof is selected from the group consisting of Ni/Cr, Ni/Al, Ni/Cr/Al, and Ni/Cr/Al/Fe. For producing these materials, general electrical plating methods can be used.

On the other hand, the thermal stress relief layer 113 may be a porous material, whereby the differences in thermal expansion coefficients can be relieved by the structure of the porous material. The porous material must have a sufficient resistance to corrosion under the operating conditions of the fuel cell. As long as there is sufficient corrosion resistance, any kind of material can be used. The higher the void volume of the porous material for the thermal stress relief layer 113, the better in view of relieving the differences in thermal expansion. However, the voids volume should not be so large that gas will leak through the porous material. Actually, the desirable void volume is in the range of from about 10% to about 80%, because at less than 10% it is difficult to relieve the differences in thermal expansion, and at more than 80% the porous material will tend to leak gas.

The insulating layer 111 electrically insulates the fuel cell stack 1 from the casing 110 of the gas manifold 108. Since the insulating layer 111 is used at temperatures around 650° C., for example, insulating inorganic material can be utilized. The inorganic material must have stability towards electrolytes; $Al_2O_3$, $CaO$, $Y_2O_3$, $MgO$, $Cr_2O_3$, and $ZrO_2$ are examples of inexpensive inorganic materials that can be used. Coating the above insulating methods such as spray coating or electrophoresis. In the preparation of the insulating layer 111, it is desirable to suppress the generation of voids to a minimum and use fine particles having a particle size of about 50 microns or below because voids generated during the preparation of the insulating layer 111 lower the insulating properties thereof and cause corrosion of the casing 110. Accordingly, it is desirable to subject the formed voids to a sealing treatment. The sealing treatment can be carried out by coating or vacuum impregnating the voids with fine particles of $Al_2O_3$ or $ZrO_2$ suspended in an alcohol solution. Moreover, it is more effective to carry out a heat treatment after the sealing treatment.

The thickness of the insulating layer 111 is variable depending on the porosity of the insulating material or applied voltage during preparation. In general, a sufficient thickness for the insulating layer 111 may be, for example, from about 0.05 mm to 2.0 mm. Further, judging from the balance between the insulating properties and thermal stress influences, the preferable thickness of the insulating layer 111 is in the range from about 0.1 mm to about 1.0 mm.

In the above-described embodiment, the gas manifold is equipped with the thermal stress relief layer 113, the corrosion protection layer 112 and the insulating layer 111. However, even by using just the thermal stress relief layer 113 and insulating layer 111, or the corrosion protection layer 112 and the insulating layer 111, much improvement can be obtained compared with the conventional gas manifold. For example, in cases where a thermal stress relief layer 113 of sufficient corrosion resistance is fully coated on the casing 110 in a satisfactory manner, the corrosion protection layer 112 can be omitted. The thermal stress relief layer 113 is treated with a diffusion treatment to make a diffusion layer on and around the casing 110 in which the diffusion layer has resistance to corrosion, thereby allowing the corrosion protection layer 112 to be omitted. Examples of this thermal stress relief layer 113 are alloys in which the principal ingredients thereof are selected from the group consisting of Ni/Cr/Al or Ni/Cr/Al/Fe.

In cases where the size of the gas manifold 108 is relatively small, for example, 50 cm or below, or where heat cycle properties are not required as an operating condition of the fuel cell stack 1, the thermal stress relief layer 113 can be omitted by using material such as $ZrO_2$ having a heat expansion coefficient close to that of the casing 110 as the principal material of the insulating layer 111.

In the above-described embodiments, the gas manifold 108 was applied to a fuel cell stack 1 of a molten carbonate type fuel cell; however, this invention can also be applied to any other type of fuel cell.

We claim:

1. A fuel cell system comprising a gas manifold provided on the side of a fuel cell stack, said gas manifold comprising:
   a casing;
   a corrosion protection layer provided at contact areas between said casing and the side of said fuel cell stack and portions adjacent thereto for protecting said casing from corrosion;
   an insulating layer composed of an inorganic insulating material having stability towards electrolytes provided over the outer surface of said corrosion protection layer; and
   a thermal stress relief layer provided between said insulating layer and said corrosion protection layer for relieving the thermal stress arising between said casing and said insulating layer under high temperature conditions.

2. A fuel cell system comprising a gas manifold as claimed in claim 1 wherein the corrosion protection layer is composed of a heat resistant material containing aluminum.

3. A fuel cell system comprising a gas manifold as claimed in claim 1 wherein the coefficient of thermal expansion of said thermal stress relief layer is between those of said casing and said insulating layer.

4. A fuel cell system comprising a gas manifold as claimed in claim 1 wherein the thermal stress relief layer is made of porous material.

5. A fuel cell system comprising a gas manifold as claimed in claim 4 wherein the void volume of the porous material is from about 10% to about 80%.

6. A fuel cell system comprising a gas manifold as claimed in claim 1 wherein the thermal stress relief layer is composed of an alloy which is selected from the group consisting of Ni/Cr, Ni/Al, Ni/Cr/Al, and Ni/Cr/Al/Fe.

7. A fuel cell system comprising a gas manifold as claimed in claim 1 wherein the thermal stress relief layer is composed of an alloy in which the principal ingredient thereof is selected from the group consisting of Ni/Cr, Ni/Al, Ni/Cr/Al, and Ni/Cr/Al/Fe.

8. A fuel cell system comprising a gas manifold provided on the side of a fuel cell stack, said gas manifold comprising:
a casing;
a corrosion protection layer provided at contact areas between said casing and the side of said fuel cell stack and portions adjacent thereto for protecting said casing from corrosion; and
an insulating layer composed of an inorganic insulating material having stability towards electrolytes provided on the outer surface of said corrosion protection layer.

9. A fuel cell system comprising a gas manifold as claimed in claim 8 wherein the thermal expansion coefficient of said insulating layer is close to that of said casing.

10. A fuel cell system comprising a gas manifold as claimed in claim 8 wherein the principal material of said insulating layer is $ZrO_2$.

11. A fuel cell system comprising a gas manifold as claimed in claim 8 wherein said corrosion protection layer is composed of a material containing aluminum.

12. A fuel cell system comprising a gas manifold provided on the side of a fuel cell stack, said gas manifold comprising:
a casing;
an insulating layer composed of an inorganic insulating material having stability towards electrolytes provide at contact areas between said casing and the side of said fuel cell stack and portions adjacent thereto; and
a corrosion resistant thermal stress relief layer provided between said casing and said insulating layer for relieving the thermal stress arising therebetween under high temperature conditions, said thermal stress relief layer having been subjected to diffusion treatment sufficient to impart corrosion resistance to said thermal stress relief layer and said thermal stress relief layer having been coated on said casing.

13. A fuel cell system comprising a gas manifold as claimed in claim 12 wherein the coefficient of thermal expansion of said thermal stress relief layer is between those of said casing and said insulating layer.

14. A fuel cell system comprising a gas manifold as claimed in claim 12 wherein the thermal stress relief layer is made of porous material.

15. A fuel cell system comprising a gas manifold as claimed in claim 14 wherein the void volume of said porous material is from about 10% to about 80%.

16. A fuel cell system comprising a gas manifold as claimed in claim 12 wherein the thermal stress relief layer is composed of an alloy which is selected from the group consisting of Ni/Cr, Ni/Al, Ni/Cr/Al, and Ni/Cr/Al/Fe.

17. A fuel cell system comprising a gas manifold as claimed in claim 12 wherein the thermal stress relief layer is composed of an alloy in which the principal ingredient thereof is selected from the group consisting of Ni/Cr, Ni/Al, Ni/Cr/Al, and Ni/Cr/Al/Fe.

* * * * *